(12) United States Patent
Wagoner et al.

(10) Patent No.: US 8,737,102 B2
(45) Date of Patent: May 27, 2014

(54) ACOUSTIC NOISE MODIFICATION IN POWER CONVERTERS

(75) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 13/242,417

(22) Filed: Sep. 23, 2011

(65) Prior Publication Data
US 2013/0076150 A1 Mar. 28, 2013

(51) Int. Cl.
*H02M 7/44* (2006.01)
(52) U.S. Cl.
USPC ............................................. 363/98; 363/132
(58) Field of Classification Search
USPC ........... 318/85, 286, 400.4, 400.05, 558, 567, 318/569, 746, 804, 810; 323/205, 207, 236
See application file for complete search history.

(56) References Cited

U.S. PATENT DOCUMENTS

| 3,938,394 | A  | * | 2/1976  | Morrow et al. ................. 73/462 |
| 5,982,067 | A  | * | 11/1999 | Sebastian et al. ............. 310/184 |
| 6,408,008 | B1 | * | 6/2002  | Komarek et al. .............. 370/458 |
| 7,193,404 | B2 | * | 3/2007  | Weightman .................... 323/325 |
| 7,804,281 | B2 | * | 9/2010  | Wang et al. .................... 323/222 |
| 8,395,919 | B2 | * | 3/2013  | Schroeder et al. ............. 363/131 |
| 8,537,581 | B2 | * | 9/2013  | Wagoner et al. ................ 363/95 |
| 2008/0018274 | A1 | * | 1/2008 | Mori et al. ..................... 318/268 |

* cited by examiner

*Primary Examiner* — Rajnikant Patel
(74) *Attorney, Agent, or Firm* — Sutherland Asbill & Brennan LLP

(57) ABSTRACT

A boost converter including two or more inductors coupled to an input DC power source and to switches that can each be modulated with a modulation signal to control the output power of the boost converter. Two or more of the modulation signals have a relative phase other than 360° divided by the number of switches.

20 Claims, 6 Drawing Sheets

US 8,737,102 B2

ACOUSTIC NOISE MODIFICATION IN POWER CONVERTERS

FIELD OF THE INVENTION

This invention generally relates to power converters, and in particular to modifying the acoustic output from boost converters for direct current (DC) voltage conversion.

BACKGROUND OF THE INVENTION

Power converters are used to convert power from direct current (DC) power sources to alternating current (AC) power output for use on local loads or for delivery to a power grid. Such power converters are instrumental in applications such as for providing AC power from DC distributed power sources like photovoltaic (PV) cells. With an increased societal focus on anthropogenic environmental degradation, particularly in relation to greenhouse gas (GHG) and certain other emissions, there has been an increased trend towards distributed renewable power generation. For example, in recent years, there has been a steep increase in the number of homes and businesses that have installed roof top solar cell arrays that generate power to a home or business and also provide excess power to the power grid. Such distributed power generation sources may require power converters that are efficient, inexpensive, reliable, and have a minimal form factor. Conventional power converters typically comprise DC filters, boost converters, AC filters, inverters, and coupling to the power grid.

A conventional boost converter, also referred to as a boost chopper, can receive DC power from one or more power sources and provide a single DC power output at an output voltage that is greater than the voltage of each of the DC power sources. The DC power source can be, for example, a photovoltaic (PV) cell providing DC power directly to the boost converter. In relatively high power applications, such as power converters for distributed generation points, boost converters must be able to operate at relatively high currents and high-power. The high currents and power flow through inductors within the boost converter and as a result, constituent inductive coils of the inductors can oscillate and thereby emanate compression waves. Therefore, power converters and the constituent boost converter, in particular, can generate acoustic noise. Furthermore, some or all of the acoustic noise generated by the boost converter may be in the audible frequency range for humans ranging from 20 Hz to 20 kHz. The acoustic noise, especially in the audible frequency range, can be a nuisance for humans, pets, and livestock that may be in proximity of power converters.

BRIEF SUMMARY OF THE INVENTION

In one embodiment, a boost converter can include N inductors electrically connected to a power source and each of the N inductors can be further electrically connected to a corresponding switch. Each of the switches can be electrically connected to an output of the boost converter. The boost converter can further include a boost converter controller providing pulse width modulation (PWM) signals to each of the switches, wherein at least two of the PWM signals are phase separated from each other by a phase other than 360° divided by N (2π/N radians).

In another embodiment, a method can be provided for outputting power from a boost converter by providing N inductors electrically connected to a power source and providing a corresponding switch electrically connected to each of the N inductors and to an output port of the boost converter. The method can further include determining pulse width modulation (PWM) signals for modulating each of the switches, wherein at least two of the PWM signals can have a relative phase other than 360° divided by N (2π/N radians). The PWM signals can then be provided to corresponding switches to output power at the output port.

In yet another embodiment, a power converter can have at least one power source providing power, a boost converter receiving the power from the at least one power source and outputting direct current (DC) power, an inverter receiving the DC power and outputting alternating current (AC) power, and a grid coupling providing the AC power to a power grid. The boost converter can include N inductors electrically connected to a power source and each of the N inductors can further be electrically connected to a corresponding switch. Each of the switches can be electrically connected to an output of the boost converter. The boost converter can further include a boost converter controller providing pulse width modulation (PWM) signals to each of the switches, wherein at least two of the PWM signals can be phase separated from each other by a phase other than 360° divided by N (2π/N radians).

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for DC-to-DC voltage conversion with improved electrical output, as well as, acoustic output, especially in the audible frequencies. Such improvements may entail spectral modification of the sonic output. Some example improvements may include reduced total sonic output in the audible frequency range, reduced acoustic output at frequencies known to be unpleasant when heard by humans, pets, or livestock, and increased acoustic output at frequencies known to be pleasant when heard by humans, pets, or livestock. Other improvements with regard to the acoustic output from boost converters may relate to the consistency, continuity, and tonal features of the acoustic output. For example, the improved acoustic output may entail modifying the spectral output of the audible noise such that the noise is not substantially mono-tonal or bi-tonal and instead provide multi-tonal output. In another aspect, white or near-white (pink) acoustic noise may be less unpleasant than acoustic noise with relatively discrete spectral output. Additionally, a more pleasant acoustic output may be one that is substantially time invariant with regards to tone and magnitude. The embodiments of the invention may further provide the aforementioned improvements with relatively little or no degradation in the efficiency and the ripple voltage of the converted DC output power from a boost converter.

Example embodiments of the invention will now be described with reference to the accompanying figures.

Figure 1:
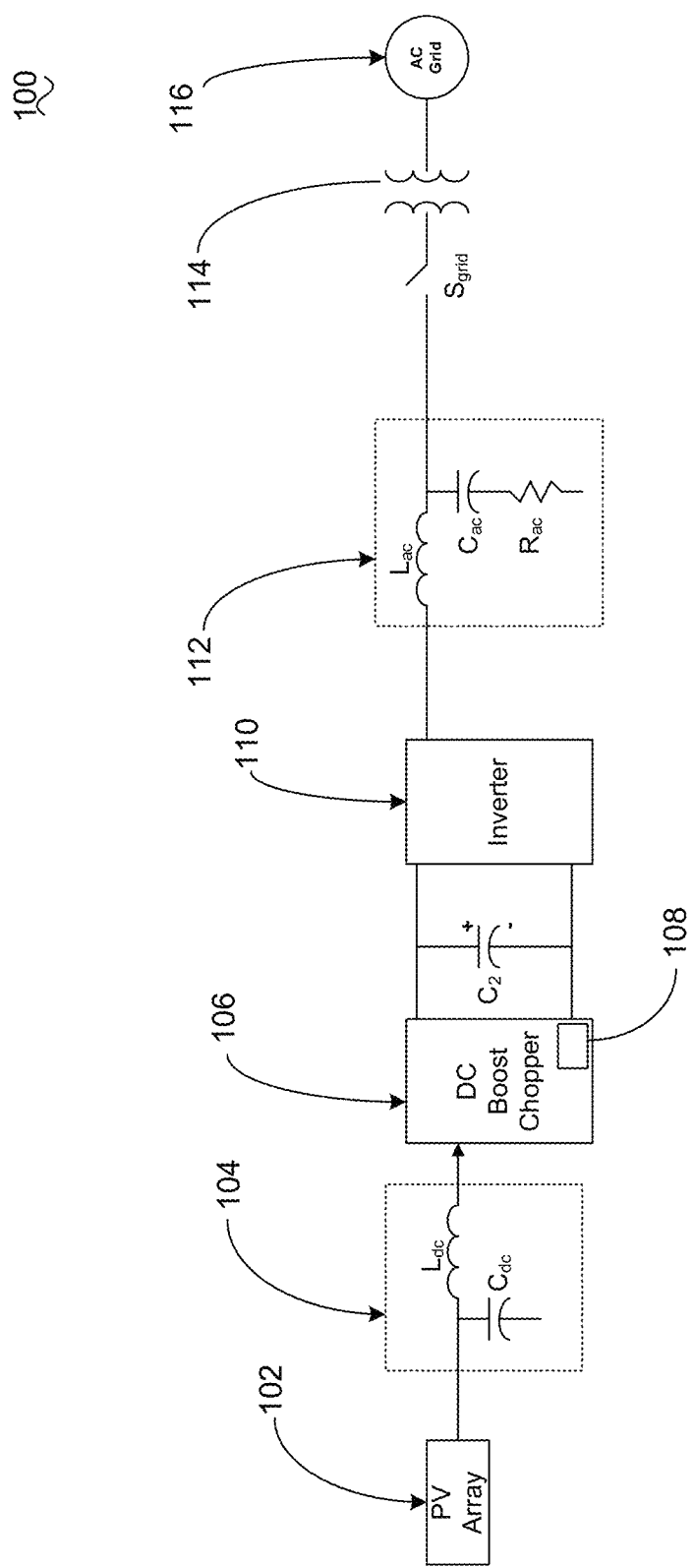
FIG. 1 is a block diagram of an example power converter incorporating a DC boost converter that can be operated according to an embodiment of the invention.

Referring now to FIG. 1, a power system 100 that can be operated according to an embodiment of the invention is described. The power system 100 can include a DC power supply such as a photovoltaic (PV) array 102, electrically connected to a DC input filter 104 that can be further electrically connected to a DC boost converter 106. The DC boost converter 106 can be connected to an inverter 110 that outputs AC power to an AC filter 112 with a capacitor $C_2$ shunted from the power to ground between the DC boost converter 106 and the inverter 110. The output of the AC filter 112 can be electrically connected to a switch $S_{grid}$ and a coupling 114 to a power grid 116. The boost converter 106 may further include a boost converter controller 108.

Although, the DC power source is illustrated as a PV array 102, it can, in other embodiments, be any DC power source including, but not limited to, a photovoltaic cell, a fuel cell, and electrolytic cell, or combinations thereof. As a further embodiment, the power source can be non-DC power sources such as from wind harvesting, water harvesting, or solar-thermal (solar concentrator) sources. Additional power sources can include a rectified turbine-generator output where the turbine is driven using any variety of known methods including, but not limited to, burning of fossil fuels and other hydrocarbons, nuclear, hydroelectric, or combinations thereof.

One purpose of the DC input filter 104 is to block signals with the chopping frequency of the boost converter 106 from interfering with the DC power supply 102. The DC input filter 104 can include an inductor $L_{dc}$ and a capacitor $C_{dc}$. The inductor $L_{dc}$ and capacitor $C_{dc}$ may be appropriately sized to filter out relatively high frequency components from the boost converter 106. The DC input filter 104 may also be implemented by any known alternative configuration other than the LC configuration shown.

One purpose of the DC boost converter 106 may be to step up DC voltage. In other words, the DC boost converter 106 may accept power at a certain DC input voltage and output the power at a voltage greater than the DC input voltage. The DC boost converter 106 is described in greater detail in reference to FIG. 2-4 below.

One purpose of the capacitor $C_2$ may be to filter out any high frequency components at the output of the DC boost converter 106, prior to the signal being provided to the inverter 110. DC power with a boosted voltage is provided to the inverter 110 and the inverter 110 converts the DC power to AC power at its output.

One purpose of the AC filter 112 may be to condition the output power of the inverter 110 to filter out any high frequency components from the inverter 110 output such as the chopping frequency of the inverter 110. The AC filter 112 may include an inductor $L_{ac}$, a capacitor $C_{ac}$, and a resistor $R_{ac}$.

The switch $S_{grid}$ may selectively disconnect the power from the inverter 110 to the power grid 116. When $S_{grid}$ is closed, AC power from the inverter 110 may be supplied to the power grid 116 via the coupling 114.

Figure 2:
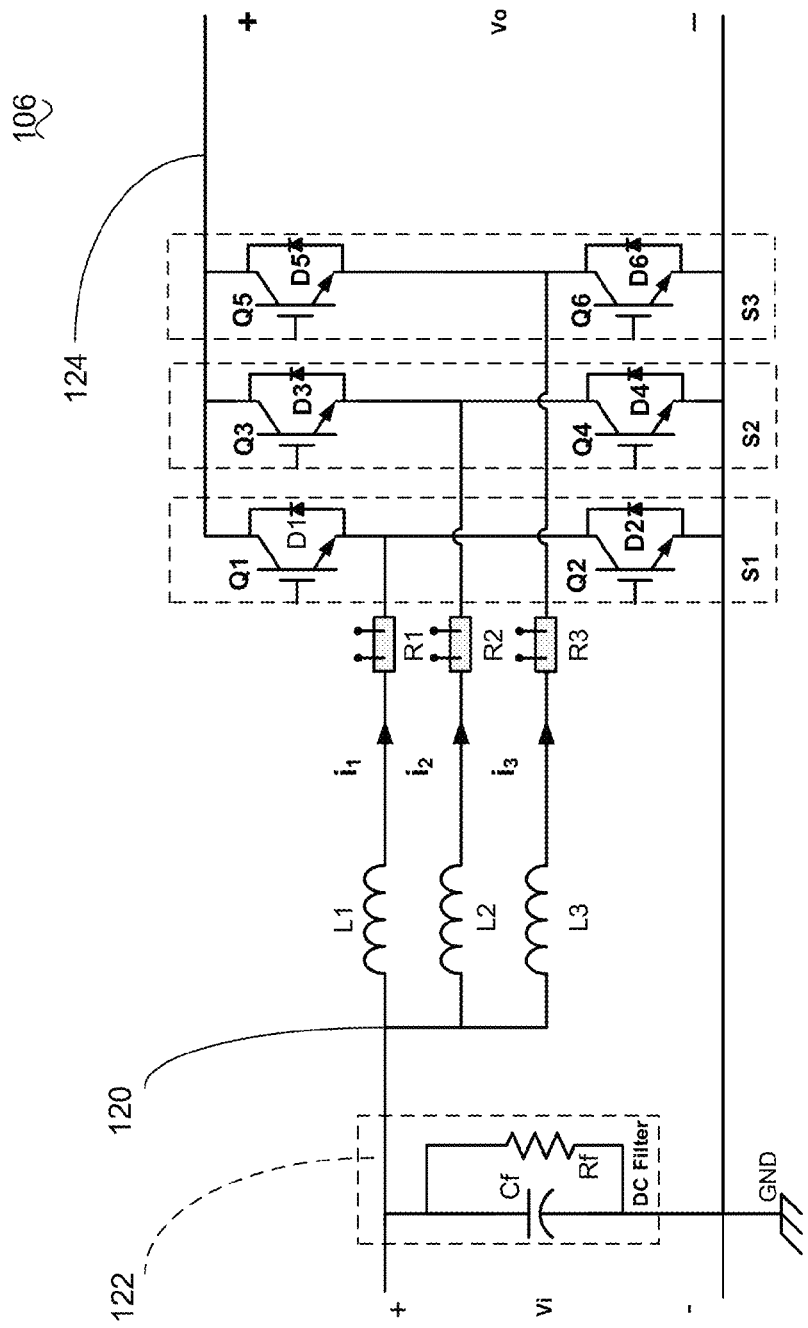
FIG. 2 is a circuit schematic of an example boost converter with three bridges that can be operated according to an embodiment of the invention.

Referring now to FIG. 2, an example circuit diagram of the boost converter 106 is discussed. The boost converter 106 receives DC power from a DC power source 102 as described above in conjunction with FIG. 1. The input voltage of the boost converter 106 is designated as $v_i$ at an input port 120 of the boost converter 106. The boost converter may optionally include a DC filter 122 that may be constructed as resistor R1 and a capacitor C1 in parallel and shunted from the input port 120 to the ground GND of the boost converter 106. The boost converter can further include three inductors $L_1$, $L_2$, and $L_3$ in a parallel configuration and each inductor $L_1$, $L_2$, and $L_3$ can be electrically connected to each other. Each of the inductors $L_1$, $L_2$, and $L_3$ can further be electrically connected to a corresponding switch $S_1$, $S_2$, and $S_3$, respectively. The switches can further be connected to an output port 124 of the boost converter 106 with output voltage $v_o$ referenced to ground GND. The switches $S_1$, $S_2$, and $S_3$ in combination with their corresponding inductors $L_1$, $L_2$, and $L_3$, respectively, are often referred to as bridges of the boost converter 106. Each of the switches $S_1$, $S_2$, and $S_3$ can include two transistors such as insulated gate bipolar transistors (IGBTs) $Q_1, Q_2, Q_3, Q_4, Q_5,$ and $Q_6$ and two diodes $D_1, D_2, D_3, D_4, D_5,$ and $D_6$ electrically connected across the emitter and collector of each of the IGBTs $Q_1, Q_2, Q_3, Q_4, Q_5,$ and $Q_6$, respectively.

Continuing on with FIG. 2, the boost converter 106 can additionally include current sensors illustrated in the form of shunt resistors $R_1, R_2$ and $R_3$ for measuring the currents $i_1, i_2,$ and $i_3$ that flows through the inductors $L_1, L_2,$ and $L_3$, respectively. The current measurements $i_1, i_2,$ and $i_3$ may be used to generate and control signals to modulate the switches $S_1, S_2,$ and $S_3$. More discussion with respect to the control signals to modulate the switches $S_1, S_2,$ and $S_3$ is provided in conjunction with the descriptions of FIGS. 3 and 4.

In operation, the inductors $L_1, L_2,$ and $L_3$ conduct current from the DC power source 102 to the switches $S_1, S_2,$ and $S_3$ in a manner in which the switches conduct the current through each of the inductors $L_1, L_2,$ and $L_3$ when the corresponding switch is turned on. Consider a single bridge containing the $L_1$ inductor to better illustrate this. When switch $S_1$ is turned on, current flows from the DC power source 102 through the inductor $L_1$ and through IGBT $Q_2$ to ground GND. During the time while the switch $S_1$ is turned on, energy from the DC power source 102 is stored in the inductor $L_1$ when the voltage across the inductor is $v_i$. When the switch $S_1$ is subsequently turned off, the voltage across the inductor $L_1$ is approximately $(v_o\text{-}v_i)$ and current flows through diode $D_1$ to the output port 124, and flows to any load (not shown) that may be connected to the output port 124.

The energy stored in the inductor $L_1$ when the switch $S_1$ is turned on is:

$$E = \frac{1}{2}L_1 I_{L1}^2 \quad (1)$$

From equation (1) it is apparent that a greater inductance provides for the storage and transfer of a greater amount of energy. Therefore, for high power converter systems, large inductances are needed for the transfer of the DC source 102 power efficiently. The relatively large inductors $L_1$, $L_2$, and $L_3$, when switching from a power storing state, when the corresponding switch $S_1$, $S_2$, and $S_3$ is on, to a power discharging state, when the corresponding switch $S_1$, $S_2$, and $S_3$ is off, can generate compression waves due to oscillation of constituent coils of the inductors $L_1$, $L_2$, and $L_3$. Due to the large size of the inductors $L_1$, $L_2$, and $L_3$, the compression waves generated may have an amplitude great enough to be heard by humans or other animals. In some cases, the sound may be annoying to humans or other animals.

Continuing on with the operation of the boost converter 106, the voltage across an inductor is:

$$v_i = L\frac{di}{dt} \quad (2)$$

where L is the inductance of the inductor,
$v_i$ is the current through the inductor, and
di/dt is the first derivative with respect to time of the current.

Applying equation (2) to the boost converter 106 when the switch $S_1$ is on, the change in current through the inductor $L_1$ can be determined as:

$$\Delta I_{L1\_on} = \frac{1}{L_1}\int_0^{DT} v_i dt = \frac{v_i DT}{L_1} \quad (3)$$

where T is a period of a periodic modulation signal applied to the switch $S_1$, and
D is the duty cycle of the periodic modulation signal.

Now applying equation (2) to the boost converter 106 when the switch is off, the change in current through the inductor $L_1$ can be determined as:

$$\Delta I_{L1\_off} = \frac{1}{L_1}\int_{DT}^{T} (v_i - v_o) dt = \frac{(v_i - v_o)(1-D)T}{L_1} \quad (4)$$

Since in steady state, the change in current during the on period and off period of the switch $S_1$ must sum to zero, equations (3) and (4) can be used to determine the DC gain from a single bridge of the boost converter as:

$$\frac{v_o}{v_i} = \frac{1}{1-D} \quad (5)$$

When multiple bridges and inductors $L_1$, $L_2$, and $L_3$ are present in the boost converter 106, the DC voltage gain expression is different from equation (5), but is still, in part, dependent on the duty cycle of the signal used to modulate the switches $S_1$, $S_2$, and $S_3$.

Although the boost converter 106 is shown to have only three inductors $L_1$, $L_2$, and $L_3$, there may be any number of bridges, where bridges are defined as an inductor $L_1$, $L_2$, and $L_3$ connected to a DC power source 102 with a switch $S_1$, $S_2$, and $S_3$ attached thereto. For example, a boost converter may include four bridges with four inductors or two bridges with two inductors. In another embodiment, each bridge may include more than one discreet inductor in series. In other words, there may be two or more inductors in series connected to a switch.

The resistor $R_f$ and capacitor $C_f$ of the optional DC filter 122 may have appropriate values to filter out spurious transients from the power source 102 that may negatively impact the operation of the boost converter 106. For example, spurious transients and very high frequency components may be output from the power source 102 when a cloud or some other object casts a shadow on the PV array 102 and then again when the cloud or other object no longer casts a shadow on the array. The purpose of the DC filter 122 is, among other things, to filter out such transients and high frequency components from the DC power source 102. The DC filter 122 may be implemented in other configurations than the RC configuration shown, including LC or RLC configurations as is well understood in the art.

The signal from the current sensors in the form of shunt resistors $R_1$, $R_2$ and $R_3$ may be provided to the boost converter controller 108 to generate control signals such as pulse width modulation (PWM) signals for modulating the switches $S_1$, $S_2$, and $S_3$. The current sensors may be any known apparatus for measuring current such as an ammeter.

Although the switches $S_1$, $S_2$, and $S_3$ are shown to include two IGBTs and two diodes each, there can be many other implementations of the switches $S_1$, $S_2$, and $S_3$. To illustrate further, consider switch $S_1$ connected to inductor $L_1$. In one implementation of the switch $S_1$, the top IGBT $Q_1$ and diode $D_1$ combination may be replaced by a single diode. A similar implementation may be used for switches $S_2$, and $S_3$.

It should be noted, that the circuit topology of the boost converter 106 may be modified in various ways in accordance with certain embodiments of the invention. For example, in certain embodiments, one or more circuit components may be eliminated or substituted with equivalent or nearly equivalent circuit elements. Additionally, in other embodiments, other circuit elements may be added to the boost converter 106.

Figure 3:
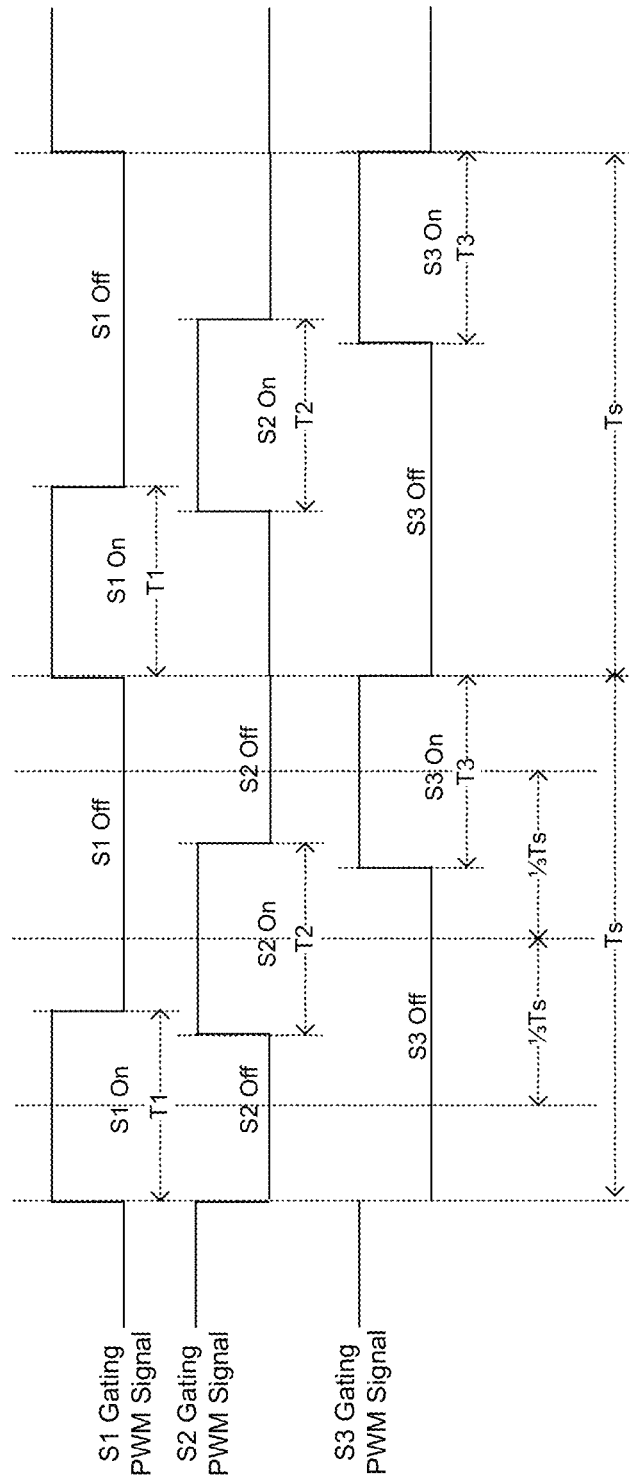
FIG. 3 is a graphical representation of pulse width modulation (PWM) control signals when provided to each bridge of the boost converter of FIG. 2, operates the boost converter according to known methods in the prior art.

Referring now to FIG. 3, the modulation of the switches $S_1$, $S_2$, and $S_3$ and operation of the boost converter 106 according to conventional methods are discussed. Examples of interleaved PWM signals for modulating switch $S_1$ is shown on top, for switch $S_2$ in the middle, and switch $S_3$ on the bottom. All of the PWM signals have a period of $T_s$. The $S_1$ signal has a duty cycle of $T_1/T_s$, the $S_2$ signal has a duty cycle of $T_2/T_s$, and the $S_3$ signal has a duty cycle of $T_3/T_s$. The time period in this example $T_s$ is less than the sum of the on time within a period of the three signals ($T_1+T_2+T_3$). As a result, there is a period of time when two of the three switches $S_1$, $S_2$, and $S_3$ can be turned on simultaneously. In this example, the relative phase between the three PWM signals is 120° and interleaving the three PWM signals with a phase of about 120° may reduce ripple current at the output port 124 of the boost converter 106. In other words, the relative phase between each of the PWM signals is 360° divided by the number of bridges (360°/3=120°) in the boost converter 106.

In one embodiment, the period Ts of the signals may be about 2 ms, corresponding to a frequency of about 500 Hz. At this frequency, there may be strong spectral electrical output at about 1.5 kHz. Additionally, there may be acoustical noise with a relatively high output at about 1.5 kHz, 3 kHz and 4.5 kHz. A high spectral output at these frequencies, heard as primarily a tri-tonal sound, can be unpleasant to humans and other animals. Additionally, both the electrical and acoustic noise may vary with time. With respect to the acoustic noise, the variation, both in magnitude and in frequency, may be relatively disconcerting, unpleasant, or otherwise distracting to humans and other animals.

Figure 4:
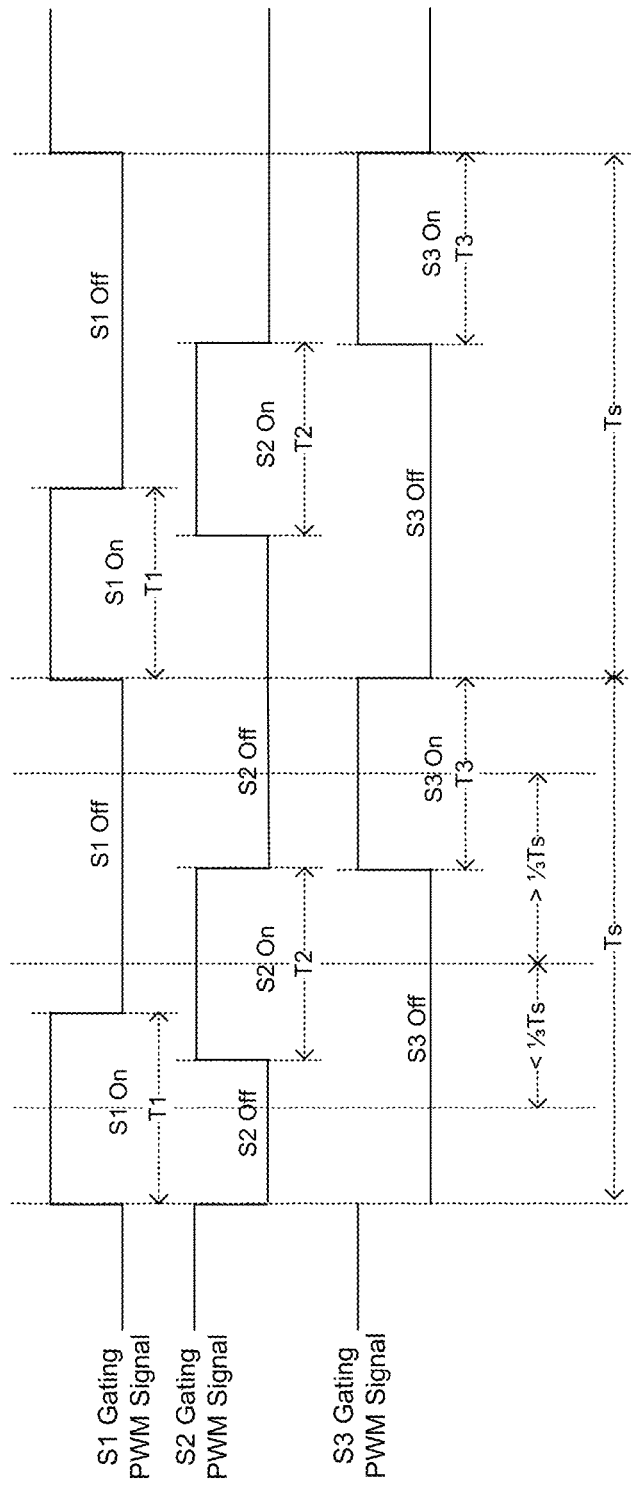
FIG. 4 is a graphical representation of example PWM control signals when provided to each bridge of the boost converter of FIG. 2, operates the boost converter according to an embodiment of the invention.

FIG. 4 shows an example of interleaved PWM signals for switch $S_1$ on top, for switch $S_2$ in the middle, and switch $S_3$ on the bottom with each of the signals having a period of $T_s$ and for operating the boost converter 106 in accordance with an embodiment of the invention. As in the case of the signals depicted in FIG. 3, the $S_1$ signal has a duty cycle of $T_1/T_s$, the $S_2$ signal has a duty cycle of $T_2/T_s$, and the $S_3$ signal has a duty cycle of $T_3/T_s$. The time period in this example $T_s$ is again, less than the sum of the on time within a period of the three signals ($T_1+T_2+T_3$). As a result, there is a period of time when two of the three switches $S_1$, $S_2$, and $S_3$ can be turned on simultaneously. The relative phase between the three PWM signals is not 120°. In this example, the relative phase between the $S_1$ PWM signal and $S_2$ PWM signal is less than about 120° and the relative phase between the $S_2$ PWM signal and the $S_3$ PWM signal is greater than about 120° and the relative phase between the $S_1$ PWM signal and the $S_3$ PWM signal is about 120°. In other words, the relative phase between each of the PWM signals is not 360° divided by the number of bridges (360°/3=120°) in the boost converter 106.

Consider now a period $T_s$ of 2 ms and frequency of about 500 Hz as was considered for the signals associated with of FIG. 3. If the signals supplied to the inverter 110 are not phase separated by about 120°, then there may be relatively strong spectral electrical output at about 500 Hz, as well as about 1.5 kHz. Additionally, given the same amount of DC power output from the boost converter 106, the strongest spectral output from this example of FIG. 3, at about 500 Hz, may be less than the power output at about 1.5 kHz when the PWM signals are offset by 360° divided by the number of bridges, or about 120° in this case, as shown in the example of FIG. 4.

With regard to the acoustic output of this example, relatively strong output may be observed at frequencies of about 500 Hz, 1 kHz, and 1.5 Hz and harmonics thereof. As a result, compared to the example of FIG. 3, when the PWM signals are phase offset by a phase other than 360° divided by the number of bridges, or 120° in this case, the acoustic output power can be emitted at a greater number of tones. In other words, the acoustic output in this example with non-120° phase offset may have a broader spectrum. Furthermore, the amount of acoustic amplitude at the single strongest tone of about 500 Hz, may be less than the amount of acoustic amplitude at the single strongest tone of about 1.5 kHz of the example of FIG. 3. In some aspects, the spreading of the acoustic output across several frequencies may make the sound resulting from the example of FIG. 4, less annoying to humans and other animals than the sound resulting from the example of FIG. 3. In another aspect, reducing the acoustic output at the strongest single tone as in the example of FIG. 4, may make the sound less unpleasant than the sound resulting from the example of FIG. 3 given that the overall power output at DC of the boost converter 106 is the same for both examples.

Although the PWM signals of FIG. 4 showed two signals with a relative phase of less than about 120° and two signals with a relative phase of greater than about 120° and the relative phase of about 120° between two other signals, the relative phase can be any phase other than about 120° between any two signals. For example, two of the relative phases can be greater than about 120° and one relative phase can be less than about 120°. As a further embodiment, two of the relative phases can be less than about 120° and the other relative phase can be greater than about 120°.

In other embodiments, the number of bridges of the boost converter 106 and therefore the number of PWM signals can be other than three. For example, a boost converter can have four bridges and be operated with at least two PWM signals for modulating the switches of the boost converter having a phase shift other than 90° (360°/4) in accordance with an embodiment of the invention.

As a further embodiment, a boost converter can have two bridges where each of the switches can be modulated with a PWM signal with a relative phase therebetween other than about 180°. In such a boost converter, simulations were conducted with PWM signals with frequency of about 500 Hz, a duty cycle of about 75%, and interleaved with a relative phase of about 180° and with PWM signals with frequency of about 500 HZ, a duty cycle of about 75%, and a relative phase of about 216°. The simulation reports the current through about a 1 Ohm load across the output of the two bridge boost converters for a DC output of about 57.5 dBA for both sets of PWM signals. The results indicate that for the 180° phase signals, the strongest harmonic output at about 1 kHz was about 46.1 dBA and the strongest harmonic output at about 1 kHz for the 216° phase signals was about 44.3 dBA. Therefore, the current in the load and the resulting power output at the strongest tone is less for the 216° relative phase signals, where the phase is not equal to 360° divided by the number of bridges, than with the 180° relative phase signals, where the phase is equal to 360° divided by the number of bridges. The sound from the 216° relative phase signals may have a more pleasant tonal quality compared to the 180° relative phase signals for humans and other animals.

Figure 5:
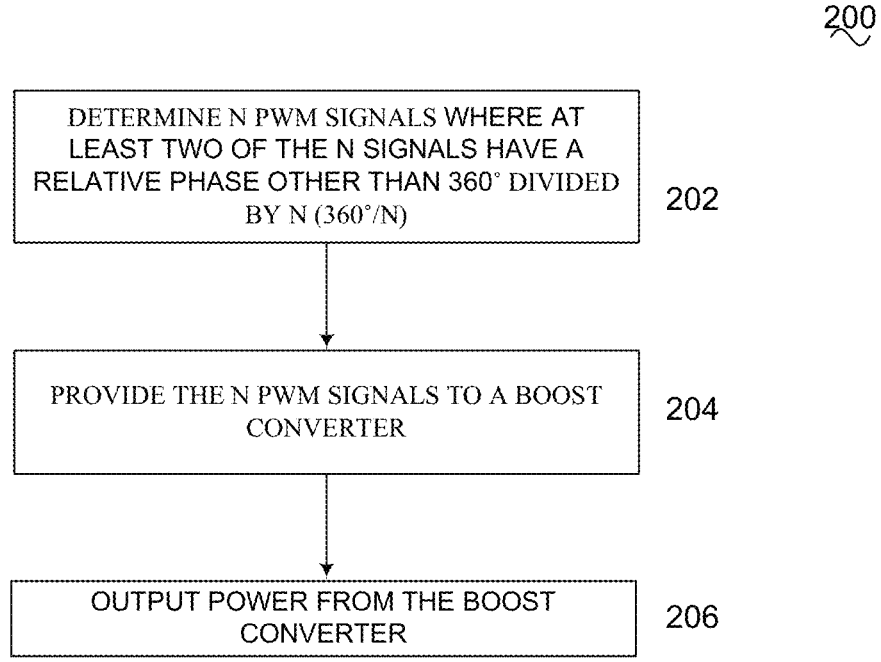
FIG. 5 is a flow diagram of an example method to output power at an output port of the boost converter according to an embodiment of the invention.

Referring now to FIG. 5, a method 200 of providing a DC-to-DC voltage conversion is depicted. The method 200 can be implemented using the example circuits, apparatus, signals, and systems as disclosed in reference to FIGS. 1, 2, and 4. At block 202, N PWM signals are determined at block 202, where at least two of the N PWM signals can be phase shifted from each other by a phase other than 360° divided by N. The PWM signals may be generated by the boost converter controller 108. At block 204, the determined signals from block 202 are provided to the boost converter 106. In particular, the N PWM signals may be provided to the switches $S_1$, $S_2$, and $S_3$ of the boost converter 106 to modulate the switches $S_1$, $S_2$, and $S_3$. At block 206, DC power can be output from the boost converter 106 as the switches $S_1$, $S_2$, and $S_3$ are modulated with the PWM signals.

It should be noted, that the method 300 may be modified in various ways in accordance with certain embodiments of the invention. For example, one or more operations of method 300 may be eliminated or executed out of order in other embodiments of the invention. Additionally, other operations may be added to method 300 in accordance with other embodiments of the invention.

Figure 6:
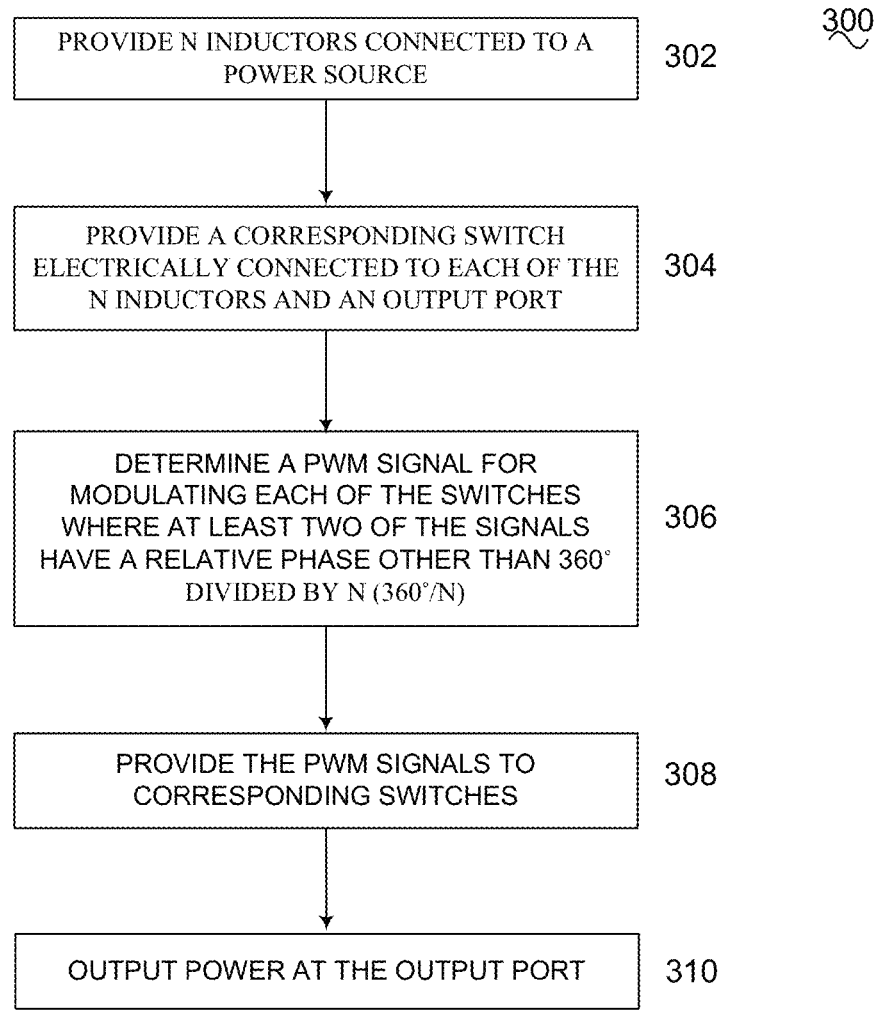
FIG. 6 is a flow diagram of an example method to output power at an output port of the boost converter according to another embodiment of the invention.

Referring now to FIG. 6, another method 300 of providing a DC-to-DC voltage conversion is depicted. Similar to method 200, the method 300 can be implemented using the example circuits, apparatus, signals, and systems as disclosed in reference to FIGS. 1, 2, and 4. At block 302, an integer number, N, inductors connected to a power source can be provided. As shown in FIG. 1, the DC power sources may in one aspect be a PV array 102 and the N inductors may be in parallel configuration to each other and connected at one node as depicted in FIG. 2. At block 304, switches corresponding to each of the inductors are provided and can be connected to each of the inductors that can be repeatedly modulated. A PWM signal is determined at block 306, where the PWM signals can be phase shifted from each other by a phase other than 360° divided by N. The PWM signals may be generated by the boost converter controller 108. At block 308, the determined signals from block 306 are provided to the switches to gate the switches. At block 310, DC power can be output at the output port as the switches are modulated with the PWM signals.

It should be noted, that the method 300 may be modified in various ways in accordance with certain embodiments of the invention. For example, one or more operations of method 300 may be eliminated or executed out of order in other embodiments of the invention. Additionally, other operations may be added to method 300 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A boost converter comprising:
N inductors electrically connected to a power source;
each of the N inductors further electrically connected to a corresponding switch, each of the switches electrically connected to an output of the boost converter; and,
a boost converter controller providing pulse width modulation (PWM) signals to each of the switches,
wherein at least two of the PWM signals are phase separated from each other by a phase other than 360° divided by N ($2\pi/N$ radians).

2. The boost converter of claim 1, wherein all N of the PWM signals are phase separated from each other by a phase other than 360° divided by N ($2\pi/N$ radians).

3. The boost converter of claim 1, wherein at least two of the PWM signals have a relative phase greater than 360° divided by N ($2\pi/N$ radians) and at least two of the PWM signals have a relative phase less than 360° divided by N ($2\pi/N$ radians).

4. The boost converter of claim 1, wherein each of the PWM signals have a relative phase that results in reduced amplitude of sound waves in the 20 to 20 kilo-hertz (KHz) frequency range from the boost converter.

5. The boost converter of claim 1, wherein the each of the PWM signals have a relative phase that results in audible output that is substantially at a fixed frequency and fixed magnitude over a time period that is greater than a fundamental period of the boost converter.

6. The boost converter of claim 1, wherein the N inductors comprise a first, second and third inductor electrically connected to the power source and the PWM signal corresponding to the first inductor is phase shifted from the PWM signal corresponding to the second inductor in a range of 105° (1.833 radians) to 115° (2.007 radians).

7. The boost converter of claim 6, wherein the PWM signal corresponding to the second inductor is phase shifted from the PWM signal corresponding to the third inductor in a range of 125° (2.182 radians) to 135° (2.356 radians).

8. The boost converter of claim 6, wherein the sum of the relative phase between the PWM signal corresponding to the first and second inductor and the relative phase between the PWM signal corresponding to the second and third inductor is 240° (4.189 radians).

9. The boost converter of claim 1, further comprising N current sensors to measure the current through each of the N inductors, wherein the current measurement is used to generate the each of the PWM signals and maintain a substantially fixed relative phase for each of the PWM signals.

10. A method comprising:
providing N inductors electrically connected to a power source;
providing a corresponding switch electrically connected to each of the N inductors and to an output port;
determining pulse width modulation (PWM) signals for modulating each of the switches, wherein at least two of the PWM signals have a relative phase other than 360° divided by N ($2\pi/N$ radians);
providing the PWM signals to corresponding switches; and,
outputting power at the output port.

11. The method of claim 10, wherein determining the PWM signals for each of the switches with all N phase separated from each other by a phase other than 360° divided by N ($2\pi/N$ radians).

12. The method of claim 10, wherein determining the PWM signals for each of the switches with the PWM signals having a relative phase that results in reduced amplitude of sound waves in the 20 to 20 kilo-hertz (KHz) frequency range generated.

13. The method of claim 10, wherein providing N inductors comprises providing a first, second and third inductor electrically connected to the power source and the PWM signal corresponding to the first inductor is phase shifted from the PWM signal corresponding to the second inductor in a range of 105° (1.833 radians) to 115° (2.007 radians).

14. The method of claim 13, wherein the PWM signal corresponding to the second inductor is phase shifted from the PWM signal corresponding to the third inductor in a range of 125° (2.182 radians) to 135° (2.356 radians).

15. A power converter comprising:
at least one power source providing power;
a boost converter receiving the power from the at least one power source and outputting direct current (DC) power;
an inverter receiving the DC power and outputting alternating current (AC) power; and,
a grid coupling providing the AC power to a power grid,
wherein the boost converter comprises:
N inductors electrically connected to the power source;
each of the N inductors further electrically connected to a corresponding switch,
each of the switches electrically connected to an output of the boost converter; and,
a boost converter controller providing pulse width modulation (PWM) signals to each of the switches,
wherein at least two of the PWM signals are phase separated from each other by a phase other than 360° divided by N ($2\pi/N$ radians).

16. The power converter of claim 15, wherein all N of the PWM signals are phase separated from each other by a phase other than 360° divided by N (2π/N radians).

17. The power converter of claim 15, wherein each of the PWM signals have a relative phase that results in reduced amplitude of sound waves in the 20 to 20 kilo-hertz (KHz) frequency range from the boost converter.

18. The power converter of claim 15, wherein the each of the PWM signals have a relative phase that results in audible output that is substantially at a fixed frequency and fixed magnitude over a time period that is greater than a fundamental period of the boost converter.

19. The power converter of claim 15, wherein the N inductors comprise a first, second and third inductor electrically connected to the power source and the PWM signal corresponding to the first inductor is phase shifted from the PWM signal corresponding to the second inductor in a range of 105° (1.833 radians) to 115° (2.007 radians).

20. The power converter of claim 19, wherein the PWM signal corresponding to the second inductor is phase shifted from the PWM signal corresponding to the third inductor in a range of 125° (2.182 radians) to 135° (2.356 radians).

* * * * *